July 8, 1952 H. C. HARRISON 2,602,853

SELECTIVE SIGNALING SYSTEM

Filed Aug. 8, 1947 2 SHEETS—SHEET 1

INVENTOR
H.C.HARRISON
BY J W Schmied
ATTORNEY

July 8, 1952 H. C. HARRISON 2,602,853

SELECTIVE SIGNALING SYSTEM

Filed Aug. 8, 1947 2 SHEETS—SHEET 2

INVENTOR
H.C.HARRISON
BY J W Schmied
ATTORNEY

Patented July 8, 1952 2,602,853

UNITED STATES PATENT OFFICE 2,602,853

SELECTIVE SIGNALING SYSTEM

Henry C. Harrison, Port Washington, N. Y., assignor to Bell Telephone Laboratories, Incorporated, New York, N. Y., a corporation of New York Application August 8, 1947, Serial No. 767,487

6 Claims. (Cl. 177—353)

Figure 1:
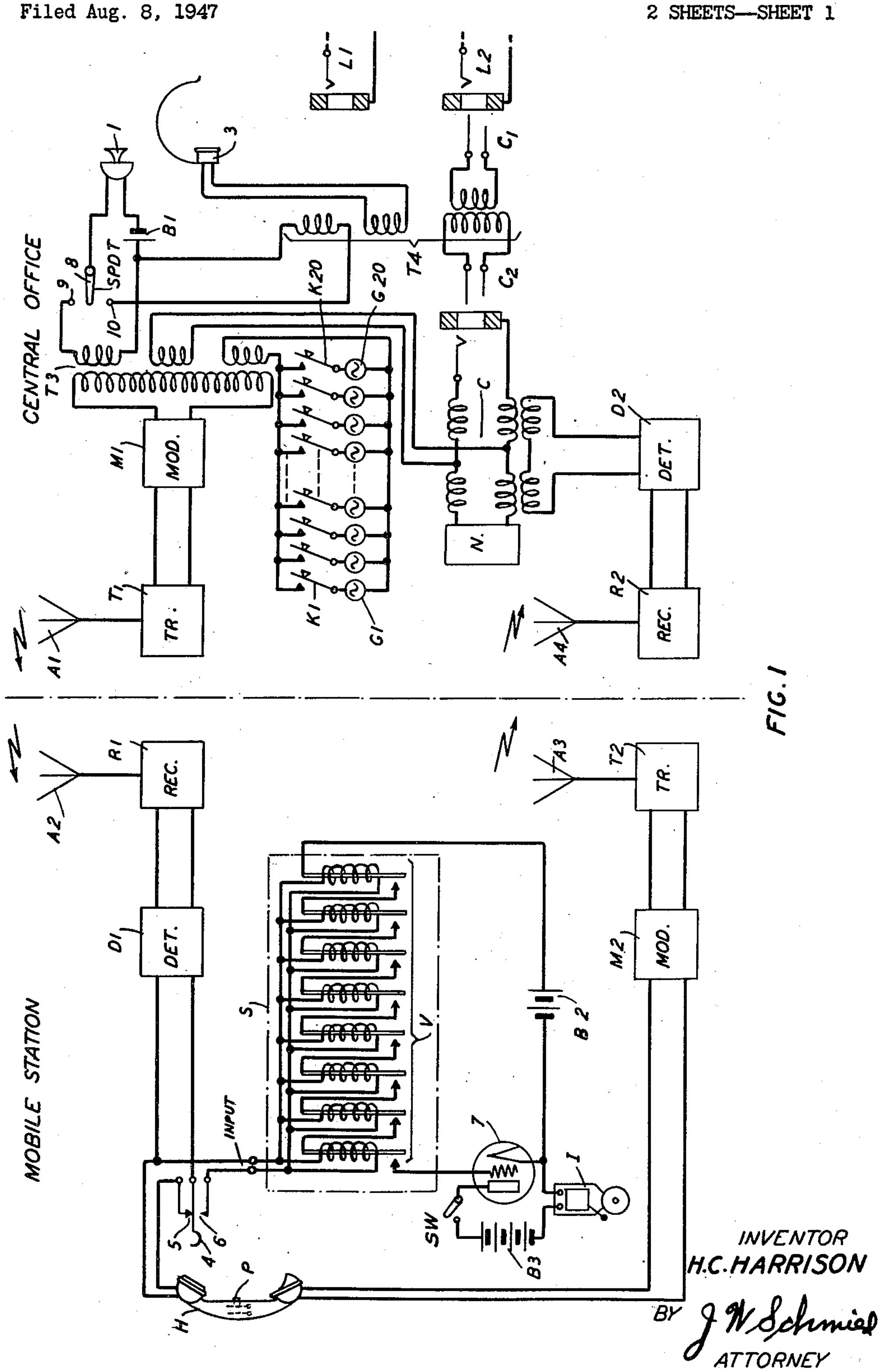

The present invention relates to a telephone or telegraph signaling system, and more particularly to a station calling system for mobile radio telephone service.

In mobile radio telephone systems it is generally desired to call one station only, or at most a select few, out of a larger number of mobile stations all of which are tuned to receive on a common radio frequency channel. In one well known type of system the method of calling mobile subscribers is by transmitting a train of dial impulses over the assigned radio frequency channel, receiving these radio signals at the mobile station and applying the rectified output from the receiver detector to the solenoid of a ratchet type selector switch which is advanced step by step in response to each of the successive impulses received. When the correct number of impulses is thus received by a mobile station, and in the correct sequence, the selector switch of the called station completes a ringing or other signal circuit. The selector switches of all other mobile stations in the same system are also advanced in response to the received impulses, but since they are not wired for the particular sequence of impulses which have been transmitted they do not advance to a position to close their respective ringing circuits. This type of system is susceptible of great improvement, and the objects of this invention are to provide such improvement.

One disadvantage of the impulse signaling system is that the ratchet type selector switches are delicate pieces of apparatus, not at all well suited to withstand the shock and abuse of mobile service. Another disadvantage of the ratchet type selector switches is their cost, and the fact that at present each mobile subscriber's set must include such a device, which increases the cost of installation and maintenance, thus adding to the cost of mobile radio telephone service. Still another very serious objection is that signaling by a series of impulses transmitted sequentially requires a considerable period of time, of the order of several seconds, and during the time that a signal call is being transmitted, the mobile station may pass beneath a steel bridge or underpass, or between steel building structures, where partial shielding may prevent radio reception of the entire call signal, thus giving rise to false signaling or no signaling at all. Other disadvantages of the selector type switches are that they are large bulky devices, having moving parts with considerable mass, and requiring appreciable power for their operation, thus imposing a substantial drain on the automobile battery.

The achieved objects of the present invention are to overcome the disadvantages of the impulse signaling system now used in mobile radio telephone service by providing a calling system which is more rapid in response, more reliable in operation and more economical to manufacture and maintain.

In general, the system of the present invention contemplates the transmission by the calling station of a single radio frequency carrier to which all mobile receiving stations of the system are tuned, said carrier being simultaneously modulated by a plurality of audio frequencies, the particular combination of which is peculiar to the station called. Each mobile receiving station in the system is provided with a selector device comprising a distinctive combination of tuned vibrating resonant relays which are responsive to only one particular group of audio frequencies. Thus, when the detected radio frequency signal at the mobile receiver has been modulated at the transmitter by the distinctive combination of audio frequencies for which the mobile receiving station selector is adapted, a bell or other alarm device is operated to indicate that the station is being called. All other mobile receiving stations in the system will receive the same carrier signal but, unless their vibrating reed selectors are tuned to resonate at the particular frequencies with which the carrier is modulated, their call indicating devices will not be operated. Thus the system provides means for signaling a single one of a large number of mobile radio telephone subscribers all of whose receiving sets are operated on the same radio frequency channel.

The system as employed in mobile radio telephone service comprises one or more central offices connected with one or more radio transmitters and radio receivers at fixed locations, and a plurality of mobile subscriber stations each comprising a radio transmitter and a radio receiver with a distinctive tuned vibrating reed selector and associated call indicating device. Calling signals originate in the central office and are transmitted from the fixed station, or stations, to the mobile receiving set, the entire call signal being transmitted simultaneously and instantaneously. When a telephone subscriber desires to call a mobile station subscriber he transmits his request for such service to the central office where a mobile service operator sets up the call and transmits an appropriately modulated calling signal to the station desired. The calling signal when detected at the mobile station receiver sets all of the selector relays into vibration, thereby completing an alarm circuit. If the call is completed the subscriber at the station called answers by picking up his telephone handset and pressing a "push-to-talk" switch which operates his mobile transmitter. His transmissions are then received by one of the fixed receiving stations, carried by land lines to the central office and there retransmitted to the telephone subscriber who placed the call. In the same manner calls may be made by one mobile telephone subscriber to another mobile telephone subscriber simply by asking for the mobile service operator, who will set up the call by transmitting a radio frequency carrier modulated by the audio frequencies which comprise the code signal of the station called. When the mobile subscriber answers, his transmission will be picked up by one of the fixed receiving stations connected with the central office and in this instance, will be retransmitted by radio, to the mobile telephone subscriber who placed the call.

The operation of the system which is my invention will be better understood by reference to the accompanying drawings.

Fig. 1 illustrates the essential elements of the complete two-way mobile radio telephone system in block diagram with one arrangement of the tuned reed selector unit, which is the heart of my selective signaling system, shown in simplified schematic form. The vibrating relays V of selector S may be individual reeds tuned to a distinctive frequency, or they may take the form of tuning forks having vibrating contacts on either one or both tines thereof. These vibrators may be composed of magnetic material capable of being set into vibration by alternating magnetic fields from surrounding inductance coils whenever such coils are energized by alternating current of frequencies corresponding to the natural periods of the vibrators, which in the general case may comprise contact closing bodies or devices capable of being set into vibration by alternating fields of a sufficient number of cycles. The tuned vibrating elements may be set into vibration by any suitable coupling means of electromagnetic or equivalent nature. In the preferred arrangement of my system, a detailed description of which follows, the vibrators are composed of magnetic material and are capable of being set into vibration by alternating magnetic fields from their surrounding coils whenever these coils are energized by alternating current of frequencies corresponding to the natural vibratory periods of the resonant vibrators. Vibrating contacts affixed to the movable portion of the vibrators V are arranged adjacent to fixed contacts of the selector S as shown at Fig. 1 in such manner that the contacts are normally open when the vibrators are idle, and closed during a portion of each vibratory cycle when the vibrators are in motion. With a series connection between vibrating contacts as illustrated by Fig. 1 operating potential will be applied to the grid of vacuum tube 7 only when all of the vibrating contacts are simultaneously closed, and this condition will occur only when all of the vibrators are in motion at the same time. The time required for the vibrators to build up in amplitude to the point of making contact depends on the damping or Q of the reeds. Experience with vibrators tuned to frequencies within the range of 350 to 800 cycles and having values of Q of the order of 100 to 600 has indicated that coincidence of contact closure in the selector circuit illustrated by Fig. 1 will occur approximately one-tenth to one-half second after all of the vibrators are set in motion, and such coincidence recurs approximately every five-hundredths of a second thereafter. Application of operating potential to the vacuum tube grid causes current to flow from battery B3 through the plate circuit of vacuum tube 7 to operate indicator I. A switch SW, which may be a contact on the handset switchhook, provides means for interrupting the indicator I when the call is answered. Although a grid-controlled space discharge detecting device 7 is here illustrated the detector may be a sensitive relay, a rectifier, a cold cathode gas tube, or any other suitable detecting device.

Figs. 2, 3, 4 and 5 illustrate alternative arrangements of the selector as shown at S in the complete circuit of Fig. 1.

Referring now to Fig. 1, we shall trace the sequence of operation in signaling the mobile station from the central office. Assume that a call for the mobile station comes into the central office over one of the incoming lines L1 or L2 at the operator's switchboard. The operator recognizing the incoming call plugs her cord C1 into the indicated line jack thereby connecting transformer T4 to the line, enabling her to receive the call through headset 3. At the same time the single pole, double throw switch 8, which may be operated by the operator's switchhook or hand key, is closed to contact 10 thereby enabling the operator to reply verbally to the incoming caller by means of her transmitter 1. When the operator ascertains that the call is for a mobile station she then presses the particular keys, K1 to K20, to select the frequency generators, G1 to G20, corresponding to the call number of the desired mobile station. Keys K1 to K20 are lock-up switches which remain closed until the call is completed, or abandoned, at which time they are released by a trip switch under the control of the central office operator. The closing of these keys applies a plurality of audio frequency tones to the modulator M1 through coupling transformer T3, thereby modulating the central office radio transmitter T1 with a signal which is distinctive to the particular mobile station called. In the system illustrated by Fig. 1 twenty frequency generators are represented at the central office, and eight of these frequencies are required for calling each mobile station. This arrangement of eight out of twenty provides ten thousand different combinations so that a total of ten thousand mobile stations could be served and individually called from the one central office illustrated. The frequency generators G1 to G20 may be vacuum tube oscillators, tuned vibrators, or any other means for producing the necessary plurality of sustained audio frequency tones. With the eight keys corresponding to the call of the mobile station now closed, central office radio transmitter T1 is simultaneously modulated by the selected eight audio frequency tones, and this modulated radio frequency carrier is radiated from transmitting antenna A1. The call signal being thus transmitted, the operator now plugs her second cord C2 into the jack connecting transformer T4 with hybrid coil C. This conditions the circuit so that the party placing the call may be enabled to talk with the mobile subscriber in the event the call is completed.

Now let us assume that the modulated radio frequency call signal radiated from antenna A1 is picked up by mobile station receiving antenna A2. This signal will then be received by the mobile station radio receiver R1 and detected by detector D1, the output of which will be an audio frequency signal composed of the same eight tones with which the central office transmitter has been modulated. Assuming that the mobile station is not busy at the time the call is placed, handset H will be on switchhook 4 and contact 6 will be closed, thereby connecting the output of detector D1 to the input of selector S. Thus the detected audio frequency currents are impressed upon the energizing coils of the mobile station selector, and since the central office operator has selected her modulating frequency tones to correspond to the frequencies to which the mobile station selector vibrators are tuned, all of the vibrators V will be set into motion by the alternating magnetic fields from their energizing coils. With all of the selector vibrators thus operated simultaneously, coincidence of vibrator contact closure occurs in a short time, approximately one-tenth to one-half second. When this coincidence occurs potential from battery B2 is applied to the grid of vacuum tube 7 thus causing current to flow in the plate circuit of this tube from battery B3 through indicator I. The characteristics of tube 7 may be such that plate current, once started, is sustained until switch SW is opened. Operation of the indicator signals the mobile station subscriber that his station is being called. The switch SW provided in the indicator circuit, may be operated by the handset switchhook to disconnect the indicator when the call is answered. The mobile station subscriber in answering the call lifts his handset H from switchhook 4 thereby closing contact 5 and connecting his handset receiver to the output of the radio detector. To transmit he presses his "push-to-talk" switch P thereby operating his radio transmitter T2 through modulator M2 and enabling him to transmit speech in the form of a modulated radio frequency carrier which is radiated from his transmitting antenna A3. Although transmitting antenna A3 is illustrated in Fig. 1 as being separate from receiving antenna A2, a common antenna may be used for both receiving and transmitting if appropriate switchover arrangements are provided. The signals radiated from the mobile station transmitting antenna are picked up by the central office receiving antenna A4, received by the central office receiver R2, and detected by central office detector D2, the output of which is connected to hybrid coil C. The received and detected speech from the mobile station is thus passed through the hybrid coil and cord C2 to transformer T4 thence through cord C1 to line L2 which connects with the party placing the call originally. Speech on line L2 passes in the opposite direction through transformer T4, hybrid coil C and transformer T3 to modulator M1, thence in the form of modulated radio frequency signals from transmitter T1 this speech is radiated by antenna A1 to the mobile station.

The operator monitors both sides of the call through her headset 3 which is connected with transformer T4. As soon as she ascertains that the call has been answered by the mobile station subscriber she operates a trip switch to release all of the keys K1 to K20, thereby disconnecting frequency generators G1 to G20 from transformer T3, thus interrupting the call signal and allowing speech only to enter the modulator M1.

Just as there may be a large number of mobile stations of the type illustrated by Fig. 1, so also may the system include a plurality of central offices of the type illustrated by Fig. 1. These offices may be interconnected by regular telephone lines as shown at L1 and L2. Thus if one mobile station subscriber desires to call another mobile station he picks up his handset H, presses his "push-to-talk" switch P, and transmits his request for such service to the central office operator. His transmissions are then picked up at the nearest central office by a radio receiver as shown at R2, detected by a detector D2, and fed into a hybrid coil C. The operator at this office upon ascertaining the destination of the call plugs her cord C1 into a telephone line as at L2, leading to another central office which may be identical to the one illustrated in Fig. 1. The operator at the second central office handles the call in the same manner as described above for any incoming call.

The radio transmitters T1 and T2 may be of any conventional type, and the modulators M1 and M2 may be of any well-known design suitable for modulating the radio transmitters with speech. Similarly the radio receivers R1 and R2 and associated detectors D1 and D2 may be of any conventional type well known to the communication art and suitable for receiving and detecting the modulated transmission from radio transmitters T1 and T2, respectively. The hybrid coil C with its associated balancing network N is old in the art, being of a conventional type capable of passing speech in two directions. The single pole, double throw switch 8, when closed with contact 9, provides a means for the operator to talk over her radio transmitter T1 to the mobile station subscriber without impressing her speech upon the telephone line with which she may also be connected.

Figure 2:
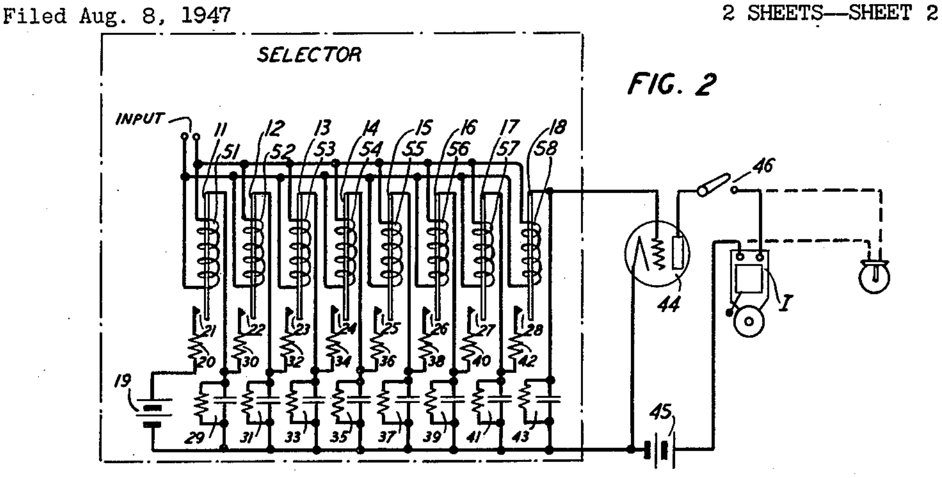
Figure 3:
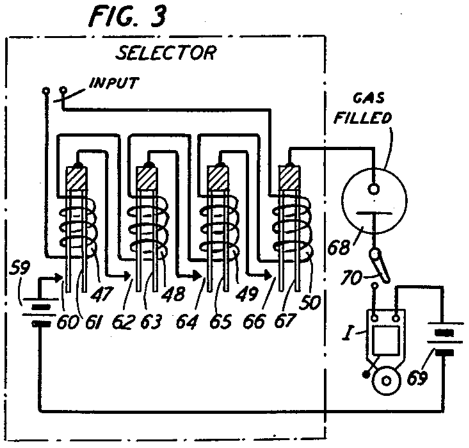
Figure 4:
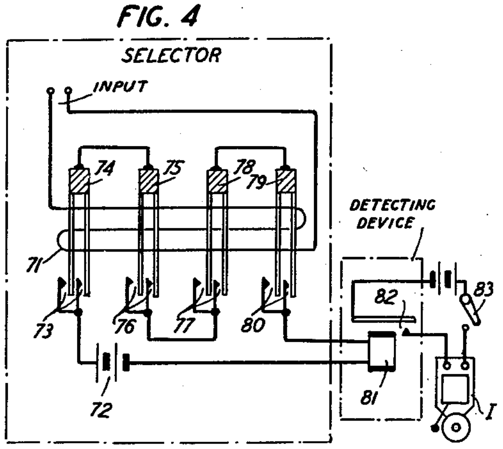
Figure 5:
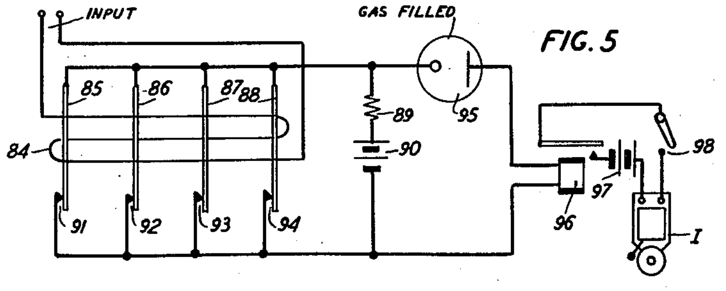

The principal novel component of this signaling system is the selector S at the mobile station, comprising a plurality of vibrator relays V each tuned to a distinctive audio frequency. The vibrating elements of this selector may take the form of single reeds, tuning forks, or any other structure capable of being accurately tuned to vibrate at a particular frequency within the audio range. The vibrators are constructed of magnetic material capable of being set into motion by a magnetic field which oscillates at the frequency to which the individual vibrator is tuned. This oscillating magnetic field is created by an inductance coil which surrounds the vibrator and is energized by the input of alternating current from the detector. Each vibrator may be energized by an individual inductance coil as illustrated in the selector circuits of Figs. 1, 2 and 3, or all of the vibrators in a given selector may be energized by a common inductance coil as illustrated in the selector circuits of Figs. 4 and 5. The embodiment of the invention wherein all of the vibrators in a given selector are enclosed within a common energizing coil, as illustrated by Fig. 4 and Fig. 5 of the drawings, is the subject of claims in applicant's co-pending divisional application Serial No. 260,132 filed December 6, 1951. The latter means of actuating the vibrators by a common energizing coil may allow a more compact arrangement of the complete selector unit. If the vibrators are individually energized by separate inductance coils, these coils may be connected in parallel to the alternating current input as shown in Figs. 1 and 2, or the coils may be connected in series as illustrated by the arrangement of Fig. 3. Whether the series or the parallel connections for the energizing coils is preferred may usually be determined by consideration of circuit constants such as matching input impedance to the detector. As suggested above, the number of vibrators included in the selector is of significance only with respect to the number of audio frequency tones available at the central office transmitting station and the total number of mobile stations to be served by a given central office. If the tuning of the vibrators is sufficiently sharp so that each vibrator responds only to a very narrow band, then the frequency separation between signal channels may be reduced. In this case, if a greater number of frequency generators are provided at the central office tratnsmitting station, a large number of frequency combinations may be obtained with fewer frequencies combined in each group so that the same number of mobile stations may be served with a smaller number of vibrators being provided at each mobile station selector. For example, ten thousand combinations may be obtained by selecting four out of thirty frequencies at the central office transmitting station, and such a central office could serve ten thousand mobile stations each of which would be equipped with a selector comprising only four tuned vibrators. Of course, if a much smaller number of mobile stations is to be served by a given central office the system may be operated with fewer frequency generators at the central office and even fewer tuned vibrators in the mobile station selector. Three alternative selector circuits each having four tuned vibrators are illustrated by Figs. 3, 4 and 5. The selector circuit illustrated schematically at the mobile station in Fig. 1 represents one of the simplest forms of my selector, having all of the vibrating relay contacts connected in a series circuit and relying upon coincidence of vibrator contact closure to establish continuity between battery B2 and the grid of vacuum tube 7, thereby operating the indicator I as explained above.

Reference is now made to Fig. 2 which illustrates an alternative arrangement of the selector circuit of Fig. 1 in which resistance and capacitance networks are connected across the contacts of the vibrating members for the purpose of reducing the initial operating time of the selector unit. The addition of resistances 20, 30, 32, 34, 36, 38, 40, 42 and resistance capacitance units 29, 31, 33, 35, 37, 39, 41 and 43 has the effect of hastening the equivalent coincidence of contact closure. This is accomplished by placing a charge from battery 19 onto condenser 29 through resistor 20 whenever contact 21 of vibrating relay 11 is closed. The charge thus placed on condenser 29 is subsequently discharged through resistor 30 and the vibrator 12 during the interval that vibrator contact 22 is closed. Thus it will be seen that even though vibrating contact 21 may not initially and at every instant be closed simultaneously with contact 22, the charge which was stored on condenser 29 during the interval that contact 21 was closed will be discharged through resistor 30 and impressed upon condenser 31 whenever vibrating contact 22 may be closed. Similarly, in this manner, condenser 33 receives a charge during the interval that vibrating contact 23 is closed and condenser 31 is discharging through resistor 32, even though at such interval vibrating contacts 21 and 22 may not be simultaneously closed to connect condenser 33 with battery 19. In like manner condenser 35 may receive a charge when condenser 33 is discharging through resistor 34 and intermittent contact 24, condenser 37 may receive a charge when condenser 35 is discharging through resistor 36 and intermittent vibrating contact 25, condenser 39 may receive a charge when condenser 37 is discharging through resistor 38 and intermittent vibrating contact 26, condenser 41 may receive a charge when condenser 39 is discharging through resistor 40 and vibrating contact 27, and similarly condenser 43 may receive a charge when condenser 41 is discharging through resistor 42 and intermittent vibrating relay contact 28. Thus it will be seen that with the circuit of Fig. 2 a potential may be applied to the grid of vacuum tube 44 when all eight vibrator elements are vibrating, even without the necessity of simultaneous contact closure at all vibrating relay contacts. Suitable resistances connected across each of the charging condensers, as shown at 29, 31, 33, 35, 37, 39, 41 and 43, provide leakage paths to prevent the condensers from retaining a charge for any substantial period of time, such as the period between reception of two successive calls, thus preventing false signaling. When a signal is applied to the grid of vacuum tube 44, plate current is caused to flow through this space discharge device from battery 45 through indicating device I and switch 46 in the same manner as was described in reference to Fig. 1 above. It has been found with the circuit of Fig. 2 that the indicating signal device may be operated with considerably less delay following the application of a signal which energizes all of the vibrators than is encountered in the selector circuit of Fig. 1. The fixed resistances 20, 30, 32, 34, 36, 38, 40 and 42 connected in series respectively with vibrating contacts 21, 22, 23, 24, 25, 26, 27 and 28, serve to limit the current flowing through these vibrating contacts and also, when current is flowing therethrough, provide means for producing a voltage drop whereby the fixed condensers connected across each of the vibrating contacts are charged.

Reference is now made to Fig. 3 wherein is illustrated an alternative selector circuit in which the vibrators are represented as tuned forks, each having a vibrating contact on one tine. This circuit illustrates the use of only four vibrators so that the selector will respond to a calling signal comprising only four audio frequencies instead of eight frequencies as are required for the selector circuits of Figs. 1 and 2. In the selector circuits of Fig. 3 it will be seen that the four tuning fork vibrators 61, 63, 65 and 67 are individually energized by separate inductance coils 47, 48, 49 and 50, all of which are connected in a series circuit to the selector input terminal. As suggested above, such series connection of individual energizing coils may be desirable in some cases to obtain a higher input impedance at the selector. The vibrating contacts 60, 62, 64 and 66 of the selector in Fig. 3 are connected in a series circuit with the cold cathode of a gas discharge tube 68 which here serves as detecting device instead of a grid controlled vacuum tube as previously illustrated in Figs. 1 and 2. The selector of Fig. 3 is operated by impressing upon the input terminals a signal which comprises alternating currents of the four frequencies to which the four forks 61 63, 65 and 67 are tuned. Thus all four forks may be set into motion and periodically all four vibrating contacts 60, 62, 64 and 66 will be closed simultaneously thereby completing a circuit to fire the gas tube 68. When the tube 68 is fired plate current flows from battery 69 through indicator I to signal the mobile subscriber that his station is being called. A switch 70, which may be on the receiver switch-hook, provides means for interrupting the indicator when the call is answered. The selector circuit of Fig. 3 may be operated with a grid controlled vacuum tube, as disclosed in Figs. 1 and 2, in lieu of the cold cathode gas tube 68, and similarly the selector circuits of Figs. 1 and 2 may be operated with a cold cathode gas tube as illustrated by Fig. 3 in lieu of the grid controlled vacuum tube shown in Figs. 1 and 2. The selector circuit of Fig. 3 may be modified by the addition of resistance-capacitance networks across each of the vibrating contacts in the manner illustrated by Fig. 2, and as explained in reference to Fig. 2, the introduction of such networks may reduce the operate time of the selector.

Referring now to Fig. 4, we see still another alternative arrangement of the selector circuit wherein are illustrated schematically four tuned forks 74, 75, 78 and 79, all of which are surrounded by a common energizing inductance coil 71. In this schematic each fork is represented as having two vibrating contacts, one adjacent to each tine, as shown at 73, 76, 77 and 80. Such an arrangement allows the vibrating relay contacts to remain closed during a greater portion of each vibratory cycle, thereby reducing the time required for the plurality of vibrators to attain coincidence of contact closure. The selector of Fig. 4 is operated by impressing upon the input terminals an alternating current signal comprising the four frequencies to which forks 74, 75, 78 and 79 are tuned. These currents passing through coil 71 create alternating magnetic fields which set all four tuned forks into vibration, thereby intermittently closing contacts 73, 76, 77 and 80. A short time after application of the input signal the vibrating contacts 73, 76, 77 and 80 will all be simultaneously closed. This coincidence of contact closure completes a circuit from battery 72 through contact 73 and tuned fork 74 to fork 75, thence through contact 76 to contact 77, thence through fork 78 to fork 79, thence through contact 80 to detecting device 81 which here is illustrated as a sensitive relay of a type which remains locked up, when once closed, until switch 83 is opened. Operation of relay 81 completes an external ringing circuit to operate the indicator I thereby signaling the subscriber that his station is being called. When the call is answered switch 83 is opened to interrupt the indicator I and release relay 81. Although a sensitive relay 81 is here illustrated as means for detecting the coincidence of contact closure in the selector circuit, either a cold cathode gas discharge tube, as illustrated by Fig. 3, or a grid controlled vacuum tube as illustrated by Figs. 1 and 2, may be employed as detecting devices in lieu of the relay 81. In like manner a sensitive relay as illustrated by 81 in Fig. 4, may be employed in the circuit of Fig. 3 in lieu of the cold cathode gas discharge tube therein illustrated, or a sensitive relay detecting device may be employed in lieu of the grid controlled vacuum tube illustrated in Figs. 1 and 2. If it should be desired to further reduce the operate time of the selector shown in Fig. 4, this circuit may be modified by the addition of resistance and capacitance networks across the vibrating contacts in the manner described in reference to Fig. 2. The use of a common energizing coil surrounding all of the vibrating elements as illustrated by inductance 71 in Fig. 4 is not confined to the circuit of Fig. 4 but may be employed as means for actuating the vibrator elements of Figs. 1, 2 or 3.

Reference is now made to Fig. 5 wherein is illustrated an alternative selector arrangement in which the vibrating contacts 91, 92, 93 and 94 of vibrators 85, 86, 87 and 88 are normally closed in idle condition and the circuit is designed to operate only when all of said contacts are simultaneously opened. In the circuit of Fig. 5 the four vibrators 85, 86, 87 and 88 are shown surrounded by a common inductance coil 84 by means of which all four vibrators may be energized. If it should be desired, however, each of the vibrators in this arrangement may be provided with individual energizing coils as shown in Figs. 1, 2 and 3. The vibrating contacts 91, 92, 93 and 94 of Fig. 5 may be predeflected springs designed to open at a critical amplitude of vibration, or they may be inertia type contacts designed to open at a critical acceleration of the vibrators. In either case these vibrating contacts will be opened only during a portion of each vibratory cycle when their associated vibrators are in motion. In the circuit of Fig. 5 whenever one or more of the contacts 91, 92, 93 and 94 are closed the negative side of battery 90 is connected to the cathode of gas tube 95 and no current flows through this tube. The selector may be operated by impressing upon the input terminals an alternating current signal comprising currents of the frequencies to which vibrators 85, 86, 87 and 88 are tuned. These currents create alternating magnetic fields in and about inductance coil 84 thereby setting all four vibrators into motion. A short time after application of the input signal which causes all of the vibrators to vibrate the condition occurs that all four vibrating contacts are simultaneously opened for an instant, and during this interval positive potential is applied from battery 90 through resistor 89 to the cathode of gas tube 95 thereby firing this tube and allowing current to flow from battery 90 through relay 96 which is a lock-up relay of the type which remains closed after it is once energized. Operation of relay 96 completes an external ringing circuit from battery 97 through indicator I to signal the subscriber that his station is being called. Switch 98, which may be a contact on the telephone switchhook, provides means for interrupting this ringing circuit when the call is answered. The circuit of Fig. 5 may be modified by the substitution of a grid-controlled vacuum tube for the cold cathode gas tube 95, in which case the occurrence of open circuit condition in the vibrating selector would apply a potential to the grid of such vacuum tube to start the flow of plate current and thereby operate an indicating device. A vacuum tube for this purpose may be selected with characteristics such that a flow of plate current is sustained once the control grid of the tube has been fired, in which case the lock-up relay need not be required to sustain the ringing circuit. Another alternative would employ a sensitive relay in place of the space discharge device 95. The vibrating elements of the selector circuit illustrated by Fig. 5 may be constructed in the form of individual reeds, or they may be tuned vibratile forks.

Throughout the foregoing discussion I have referred to my tuned reed selector as being tuned to respond to alternating currents of audio frequencies. It is to be understood, however, that the operation of my invention is not limited to the use of frequencies within the range of normal hearing but that the vibrators may be tuned to respond to frequencies below the normal audio range or they may be tuned to respond in the realm known as supersonic. Regardless of the range of the tuned reed frequency, it is expected that this frequency will always be less than the radio frequency of a carrier which it may modulate. The selection of signaling frequencies in the normally audible range is recommended as this will afford the advantage of allowing such signals to be transmitted over existing standard telephone equipment and circuits with a minimum of attenuation. It is further recommended that odd values of signal frequencies be selected so that false operation of one vibrating reed selector may not be caused by a harmonic of another signal frequency.

Although the preferred arrangement of my invention has been described as a system for calling mobile radio stations, it is to be understood that the invention is not limited to such use but that the system may be employed for signaling fixed radio stations at permanent locations, and also for signaling telephone or telegraph stations over metallic lines or any other communication circuit.

Having described the operation, what I claim as my invention is:

1. A selective signaling system comprising a plurality of tuned vibratile members, means for simultaneously vibrating said members, electrical contacts associated with each vibratile member, capacitance and a resistance connected across each of said contacts, a detecting device connected with said vibratile members and a source of electrical energy, said detecting device operable by said electrical energy as controlled by said contacts when all of said members are simultaneously in vibration, and an external signaling circuit connected with said detecting device and operable thereby.

2. A selective signaling system comprising a plurality of differently tuned vibratile members, electrical contacts secured to the vibratile portions of said members and arranged adjacent to fixed contacts so as to be normally open when said vibratile members are idle and to be closed during a portion of each vibratory cycle when said vibratile members are vibrated, means for vibrating said vibratile members individually and selectively in response to undulating currents of the same frequencies to which said members are tuned, a series circuit connecting said vibratile electrical contacts with a detecting device and a source of electrical energy, capacitance and resistance connected across each of said contacts in such manner that said series circuit is completed and said detecting device is operated by said energy upon substantial coincidence of closure of said vibratile contacts, and an external work circuit connected with said detecting device and operable thereby.

3. A selective signaling system comprising a plurality of individually tuned vibratory members, vibratile electrical contacts associated with the movable portions of said members in such manner as to be normally open in idle condition but closed during a portion of each vibratory cycle when said members are vibrating, means actuated by selected undulating currents of the distinctive frequencies to which said members are tuned whereby said members are simultaneously vibrated, a connecting circuit comprising all of said vibratile contacts in series with a detecting device and source of potential, capacitance and resistance networks connected across each of said vibratile contacts whereby substantially instantaneous operation of said detecting device is achieved by concurrent vibration of said vibratory members, and an external indicating circuit connected to the said detecting device and operable thereby.

4. A signaling system comprising a calling station and a plurality of outlying stations all interconnected with said calling station by a common transmission medium, control means at said calling station for transmitting simultaneously a selected plurality of undulating signals of distinctive frequencies combined by said control means in accordance with a predetermined code, a receiver at each of said outlying stations for receiving said transmitted signal frequencies, selective means at each of said outlying stations comprising a plurality of vibratile relays each tuned to a distinctive signal frequency, said selective means responsive only to a particular combination of simultaneous signal frequencies distinctive to each station, a source of electrical energy at each station, capacitance and resistance connected across each of said vibratile relays, and indicating means at each station operable by said electrical energy upon reception by said selective means of the distinctive combination of simultaneous signal frequencies particular to said station.

5. A signaling system comprising a plurality of distinctively tuned mechanical reeds of magnetic material, electromagnetic means for simultaneously vibrating said reeds, electrical contacts associated with each reed, capacitance and resistance networks connected across each of said contacts, a space discharge detecting device connected with a source of electrical potential and with said reeds, said detecting device operable by said electrical potential as transmitted through said contacts and networks when all of said reeds are simultaneously vibrated, and an external signaling circuit connected with said space discharge device and operable thereby.

6. A selective signaling system comprising a plurality of distinctively tuned forks of magnetic material, electromagnetic means for simultaneously vibrating said tuned forks, electrical contacts associated with each of said forks, resistance and capacitance networks connected across each of said contacts, a source of electrical energy applied to said contacts in a series circuit, a detecting device connected with said forks in said series circuits and operable by said electrical energy as transmitted through said series contacts and said networks when all of said forks are simultaneously in vibration, and an external signaling circuit connected with said detecting device and operable thereby.

HENRY C. HARRISON.

(References on following page)

REFERENCES CITED

The following references are of record in the file of this patent:

UNITED STATES PATENTS

| Number | Name | Date |
|---|---|---|
| 161,739 | Bell | Apr. 6, 1875 |
| 1,232,499 | Clausen | July 10, 1917 |
| 1,476,003 | Martin | Dec. 4, 1923 |
| 1,721,368 | Beddington | July 16, 1929 |
| 1,829,836 | Newby | Nov. 3, 1931 |
| 1,872,372 | Wensley | Aug. 16, 1932 |
| 1,860,285 | Gunn | May 24, 1932 |
| 1,917,995 | Polin | July 11, 1933 |
| 2,052,581 | Richards | Sept. 1, 1936 |

| Number | Name | Date |
|---|---|---|
| 2,152,955 | Coyne | Apr. 4, 1939 |
| 2,168,198 | Frink | Aug. 1, 1939 |
| 2,173,154 | Bernard | Sept. 19, 1939 |
| 2,198,901 | Boswau | Apr. 30, 1940 |
| 2,206,538 | Rhodes | July 2, 1940 |
| 2,368,953 | Walsh | Feb. 6, 1945 |
| 2,388,531 | Deal | Nov. 6, 1945 |
| 2,457,149 | Herbst | Dec. 28, 1948 |

FOREIGN PATENTS

| Number | Country | Date |
|---|---|---|
| 172,321 | Great Britain | Nov. 2, 1922 |
| 261,384 | Great Britain | Oct. 6, 1927 |
| 223,773 | Germany | July 2, 1910 |